(12) United States Patent
Curry et al.

(10) Patent No.: US 6,233,234 B1
(45) Date of Patent: May 15, 2001

(54) SECURE LAN/INTERNET TELEPHONY

(75) Inventors: James E. Curry, Herndon; Robert D. Farris, Sterling, both of VA (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 08/867,762

(22) Filed: Jun. 3, 1997

(51) Int. Cl.$^7$ .............................. H04L 12/56; H04L 12/66
(52) U.S. Cl. ............................................ 370/356; 370/401
(58) Field of Search .................................. 370/352, 353, 370/354, 355, 356, 357, 360, 389, 400, 401, 402, 403, 404, 405, 409, 410, 466, 467; 379/219, 220, 229

(56) References Cited

U.S. PATENT DOCUMENTS

| | | |
|---|---|---|
| 4,663,758 | 5/1987 | Lambarelli et al. . |
| 4,866,704 | 9/1989 | Bergman . |
| 5,247,571 | 9/1993 | Kay et al. . |
| 5,375,068 | 12/1994 | Palmer et al. . |
| 5,410,754 | 4/1995 | Klotzbach et al. . |
| 5,430,730 | 7/1995 | Sepulveda-Garese et al. . |
| 5,453,987 | 9/1995 | Tran . |
| 5,475,732 | 12/1995 | Pester, III . |
| 5,506,834 | 4/1996 | Sekihata et al. . |
| 5,524,110 | 6/1996 | Danneels et al. . |
| 5,572,583 | 11/1996 | Wheeler . |
| 5,583,920 | * 12/1996 | Wheeler, Jr. ........................... 379/88 |
| 5,608,786 | 3/1997 | Gordon . |
| 5,724,355 | 3/1998 | Bruno et al. . |
| 5,726,984 | 3/1998 | Kubler et al. . |
| 5,764,756 | * 6/1998 | Onweller ............................... 379/242 |
| 5,790,548 | * 8/1998 | Sistanizadeh et al. ............... 370/401 |
| 5,892,591 | * 4/1999 | Anglin, Jr. et al. .................. 358/407 |
| 5,923,659 | * 7/1999 | Curry et al. ........................... 370/401 |
| 5,940,598 | * 8/1999 | Strauss et al. ........................ 370/466 |

* cited by examiner

Primary Examiner—Chi H. Pham
Assistant Examiner—Kwang B. Yao
(74) Attorney, Agent, or Firm—McDermott, Will & Emery

(57) ABSTRACT

A system and method for providing telephony communication through a packet switched data network such as the Internet and an organization having telephone and computer terminals connected to a local area network. Selectable security is provided for the telephony applications through the use of an access gateway between the local area network and the packet switched data network operating in conjunction with an intelligent control network in a public switched telephone network. The access gateway includes storage and a processor for storing security data and running selectable applications based on pre-conditions established for the telephone terminals. Information is obtained from a party seeking to connect to a telephone terminal connected to the local area network both by dialing and by voice prompt and voice recognition dialog.

24 Claims, 9 Drawing Sheets

SECURE LAN/INTERNET TELEPHONY

FIELD OF THE INVENTION

The present invention relates to telephony over a public packet switched data network such as the Internet to and from a multi-site industrial/business establishment having a local area network linking the sites and serving as a link to the public packet switched data network through a localized gateway system.

Acronyms

The written description uses a large number of acronyms to refer to various services and system components. Although generally known, use of several of these acronyms is not strictly standardized in the art. For purposes of this discussion, acronyms therefore will be defined as follows:

| | |
|---|---|
| ADPCM | Adaptive Differential Pulse Code Modulation |
| ARPA | Advanced Research Projects Agency |
| ARPANET | Advanced Research Projects Agency NETwork |
| AS | Autonomous Systems |
| ATM | Asynchronous Transfer Mode |
| CDMA | Code Division Multiple Access |
| CO | Central Office |
| CODEC | digital CODer and DECoder |
| CPU | Central Processing Unit |
| CREN | Corporation for Research and Educational Networking |
| DHCP | Dynamic Host Configuration Protocol |
| DID | Direct Inward Dialing |
| DNS | Domain Name Server |
| DTMF | Dual Tone Multi-Frequency |
| FDDI | Fiber Distributed Data Interface |
| GAO | Government Accounting Office |
| IP | Internet Protocol |
| ISDN | Integrated Services Digital Network |
| ISP | Internet Service Provider |
| LAN | Local Area Network |
| MAC | Media Access Control |
| MILNET | MILitary NETwork |
| NSFNET | National Science Foundation NETwork |
| PC | Personal Computer |
| PABX | Private Automatic Branch Exchange |
| PBX | Private Branch Exchange |
| POTS | Plain Old Telephone Service |
| PPP | Point to Point Protocol |
| PRI | Primary Rate Interface (for ISDN) |
| PSTN | Public Switched Telephone Network |
| RAM | Random Access Memory |
| ROM | Read Only Memory |
| TCP | Transmission Control Protocol |
| SONET | Synchronous Optical NETwork |
| SMDS | Switched Megabit Data Service |
| SMDI | Simplified Message Desk Interface |
| T1 | Digital Transmission Link with 1.544 Mbps Capacity (24 voice channels) |
| T3 | Digital Transmission Link with 44.73 Mbps Capacity (672 voice channels) |
| TDMA | Time Division Multiple Access |
| X.25 | Protocol Providing Direct Connection to a Packet Switched Network |

BACKGROUND ART

Attention recently has been directed to implementing a variety of communication services, including voice telephone service, over the worldwide packet switched data network now commonly known as the Internet. The Internet had its genesis in U.S. Government programs funded by the Advanced Research Projects Agency (ARPA). That research made possible national internetworked data communication systems. This work resulted in the development of network standards as well as a set of conventions, known as protocols, for interconnecting data networks and routing information across the networks. These protocols are commonly referred to as TCP/IP (transmission control protocol/internet protocol). The TCP/IP protocols were originally developed for use only through ARPANET but have subsequently become widely used in the industry. TCP/IP is flexible and robust. TCP takes care of the integrity, and IP moves the data.

The Internet provides two broad types of services: connectionless packet delivery service and reliable stream transport service. The Internet basically comprises several large computer networks joined together over high-speed data links ranging from ISDN to T1, T3, FDDI, SONET, SMDS, ATM, OT1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries. However, since then it is estimated that the number of Internet users continues to double approximately annually.

In simplified fashion the Internet may be viewed as a series of packet data switches or 'routers' connected together with computers connected to the routers. The information providers constitute the end systems which collect and market the information through their own servers. Access providers are companies such as UUNET, PSI, MCI and SPRINT which transport the information. Such companies market the usage of their networks to the actual end users.

FIG. 9 shows a simplified diagram of the Internet 349 and various types of systems typically connected thereto. Generally speaking the Internet consists of Autonomous Systems (AS) type packet data networks which may be owned and operated by Internet Service Providers (ISPs) such as PSI, UUNET, MCI, SPRINT, etc. Three such AS/ISP networks appear in FIG. 9 at 310, 312 and 314. The Autonomous Systems (ASs) are linked by high bandwidth Inter-AS Connections 311, 313 and 315. Information providers 316 and 318, such as America Online (AOL) and Compuserve, connect to the Internet via high speed lines 320 and 322, such as T1/T3 and the like. Information providers generally do not have their own Internet based Autonomous Systems but have or use Dial-Up Networks such as SprintNet (X.25), DATAPAC and TYMNET.

In some cases, the information provider 316 or 318 operates a host server or network of servers that their customers access by dial-up connection. If a customer wants information over and above that offered by the provider, the host server provides a tunnel connection through to the high speed link and the Internet 349. Other parties may connect into the network 349 at some other point and access information offered by provider 316 or 318 through the network 349.

By way of current illustration, MCI is both an ISP and an information provider, SPRINT is an ISP, and the MicroSoft Network is an information provider using UUNET as its ISP. Other information providers, such as universities, are indicated in exemplary fashion at 324 and are connected to the AS/ISPs via the same type connections here illustrated as T1 lines 326. Parties access information on servers of providers 324 via the Internet 349. Corporate Local Area Networks (LANs), such as those illustrated in 328 and 330, are connected through routers 332 and 334 and high speed data links such as T1 lines 336 and 338. Laptop computers 340 and 342 are representative of various personal computers and the like connected to the Internet via the public switched telephone network (PSTN) and are shown connected to the AS/ISPs via dial up links 344 and 346.

Recently, several companies have developed software for use on personal computers to permit two-way transfer of real-time voice information via an Internet data link between two personal computers, for example between PCs 340 and 342. In one of the directions, the sending computer converts voice signals from analog to digital format. The software facilitates data compression down to a rate compatible with modem communication via a POTS telephone line, in some cases as low as 2.4 kbits/s. The software also facilitates encapsulation of the digitized and compressed voice data into the TCP/IP protocol, with appropriate addressing to permit communication via the Internet 349. At the receiving end, the computer and software reverse the process to recover the analog voice information for presentation to the other party. These programs permit telephone-like communication between Internet users.

PCs having voice communication capabilities can conduct two-way, real-time audio communications with each other, in a manner directly analogous to a two-way telephone conversation. However, the actual signals exchanged between two such terminal devices go through the public packet data network. Typically, such communications at least bypass long distance interexchange carriers.

Internet based telephone programs have relied on servers (not separately shown) coupled to the Internet to establish voice communication links through the networks. Each person active on the network, who is willing to accept a voice call, must register with a server. A calling party can call only those persons registered on the voice communication server.

Subsequent new developments have provided systems which are capable of avoiding such registration problems. The common assignee's copending White and Farris application Ser. No. 08/670,908, attorney docket number 680-184, filed Jun. 26, 1996, entitled Internet Telephone service, describes such a system and is incorporated by reference herein in its entirety. In that system Public switched telephone networks utilizing program controlled switching systems are arranged in an architecture with the Internet to provide a methodology for facilitating telephone use of the Internet by individual customers on an impromptu basis. Provision is made to permit a caller to set-up and carry out a telephone call over the Internet from telephone station to telephone station without access to computer equipment, without the necessity of maintaining a subscription to any Internet service, and without the requiring Internet literacy or knowledge. Calls may be made on an inter or intra LATA, region or state, nationwide or worldwide basis. Billing may be implemented on a per call, timed, time and distance or other basis. Usage may be made of common channel interoffice signaling to set up the call and establish the necessary Internet connections and addressing. Calls may be made from telephone station to telephone station, from telephone station to computer or computer to telephone station.

The foregoing approach to Internet telephony is predominantly but not exclusively addressed to individual to individual communications. From a corporate or business standpoint the Internet is currently used principally for E-mail and data communication, the latter use providing a convenient mode of exchanging large data files. At the same time voice communication over corporate LANs and interconnection thereof by wide area networks (WANs) are known.

U.S. Pat. No. 4,866,704 to Larry A. Bergman, issued Sep. 12, 1989, entitled Fiber Optic Voice/Data Network, describes an asynchronous, high-speed, fiber optic local area network originally developed under a NASA contract for tactical environments. The network supports ordinary data packet traffic simultaneously with synchronous T1 voice traffic over a common token ring channel. A voice interface module parses, buffers, and re-synchronizes the voice data to the packet network employing elastic buffers on both the sending and receiving ends. Voice call setup and switching functions are performed external to the network with ordinary PABX equipment. Clock information is passed across network boundaries in a token passing ring by preceding the token with an idle period of non-transmission which allows the token to be used to re-establish a clock synchronized to the data. Provision is made to monitor and compensate the elastic receiving buffers so as to prevent them from overflowing or going empty.

U.S. Pat. No. 5,453,987 to Hai V. Tran, issued Sep. 26, 1995, entitled Random Access Protocol for Multi-media Networks, describes a method for randomly accessing a multi-media communications network defined by a common signal path and a plurality of voice and data terminals coupled to the common signal path for communication thereon. The method includes a first step of providing a plurality of sequential time slots for transmission of a plurality of information packets, each of the information packets having a length equal to a length of a representative one of the plurality of time slots. Next, each of the time slots is provided with an access field, an address control field and an information field. The access field of each of the plurality of time slots is next monitored for identifying a null time slot that is (1) in non-communication with any of the voice or data terminals, or (2) reserved for a voice terminal in a silence period. The next step of the method is to transmit a preamble to an access field of the identified null time slot. That transmission step is followed by the step of monitoring the transmission of the preamble for collisions between terminals competing for the identified null time slot. If no collision is detected, address data and information bits are transmitted in the respective fields of the identified null time slot and a respective time slot in subsequent data frames. If a collision is detected, then the method returns to the step of monitoring the access field of each of a plurality of time slots for identifying another null time slot, and then repeating the steps which are subsequent thereto.

U.S. Pat. No. 5,524,110 to Danneels, et al., issued Jun. 4, 1996, entitled Conferencing Over Multiple Transports, describes computer based audio/video conferencing in conjunction with data conferencing in a windowed environment The system provides real-time audio, video, and data conferencing between PC systems operating in non-real time windowed environments over two or more different transports.

The following listed patents also deal with varying aspects of the same technology: U.S. Pat. No. 4,663,758, issued May 5, 1987, U.S. Pat. No. 5,506,834, issued Apr. 9, 1996, U.S. Pat. No. 5,410,754, issued Apr. 25, 1995, U.S. Pat. No. 5,430,730, issued Jul. 4, 1995, and U.S. Pat. No. 5,375,068, issued Dec. 20, 1994.

There is a need for a system to provide to corporate and other large sized business organizations a convenient access to Internet telephony communication, while at the same time providing a reasonable degree of effective security along with convenience of access and administration.

DISCLOSURE OF THE INVENTION

It is a primary object of this invention to satisfy the aforestated needs.

In one preferred embodiment the invention meets those needs by providing a novel arrangement of a localized security and address administration telephony gateway to the Internet for an industrial complex that comprises multiple office or plant sites linked by a conventional local area network or LAN. By way of illustration this may be an Ethernet LAN. Each site has work station computers connected to the LAN for data communications and has conventional PBX or PABX telephone service to work stations and telephone stations.

In this first embodiment, intra-company telephone service is provided via the multi-site PBX network which are linked by a public switched telephone network (PSTN). This network also provides a telephone link to the global community.

In addition to this conventional telephone service there is also provided an alternative Internet service to the same telephone stations. Through this Internet service it is possible to communicate with the global community without using the PSTN, at least in that portion of the communication link extending from the company telephone stations to the distal side of the Internet. If the remote party to the communication has a non-PSTN link to the Internet, all PSTNs may be by-passed. In this first arrangement the company telephone stations or terminals connect to the PBX and via the PBX to the company LAN. In this context the terms PBX and PABX are used interchangeably. The LAN is connected to a localized security and address administration telephony gateway and from there to the Internet through an Internet router. The localized access and security gateway provides the desired security.

It will be recognized that 'security' is a relative term. A secure network does not exist; nor does a secure computer. The Trusted Computing Standards Evaluation Criteria (also known as the Orange Book), established by the United States Department of Defense, concludes that one cannot simply say that a computer is secure or not secure. Instead, it indicates that different levels of security can be assigned to "grade" the security of an operating system. According to that grading system four different levels of security are represented by letters ranging from A to D. Within each level of security, a number can be used to subdivide the level further, as in A1, A2, and so on.

Security, inherently, makes it harder to enter a system by providing additional locks that users must pass. Unfortunately, legitimate users must pass those locks as well. Every security measure installed creates more work for someone. The TCP/IP protocol represents a security risk simply because it enables remote users to access files and data on machines other than their own. Aside from that, it offers a number of features designed to make using the protocol easier for users. Unfortunately, some of these open additional security loopholes.

The present invention addresses those problems using multiple approaches basically relying on address administration and segmentation, with a goal of providing what is considered to be reasonable security for the intended purpose. The basic building block in the inventive approach uses in conjunction with the network architecture a localized access and security gateway which has bridge and router capabilities. As such it has the ability to perform filtering functions.

One element of security which is relied upon is a hardware address filter table. This address filter may be applied to either or both incoming or outgoing addresses. Where it is desired that no one outside of a particular segment of the business network can access a server in that segment, the hardware address of that server may be included in the filter table. Where it is desired that outside access be denied to specific work stations or telephones, those hardware addresses may be included in the filter table. Filtering may occur at various levels of addressing. Thus servers or individual stations may not only be identified in hardware address tables, but also in IP and/or LAN protocol address tables. Also, if it is desired to limit certain workstations within the business network from accessing resources outside their local segments, the hardware addresses of those work stations may be included in a filter table. It is intended that multiple layers of inclusion and/or exclusion tables may be utilized.

It is an important feature of the invention that the physical or MAC addresses as well as the IP addresses of the business network telephone terminals be maintained confidential, except to the extent that authorized employees or personnel see fit to provide that information to outsiders.

A further layer of security may be provided by utilizing the ability of the bridge/router to filter frames by protocols. The bridge/router may be programmed to pass only the specific telephony protocol packets and block other packets. In this manner outsiders are blocked from using the telephony entry for the purpose of unauthorized access to internal data resources. As a still further safeguard, the gateway may be provided with the ability to compare the identity of the calling outside station to a table of allowed stations before passing the call on for further processing. In this manner specific callers or classes of callers may be blocked by the gateway.

Another aspect of the inventive solution to the defined problem is the assignment of internal telephone station addresses in conjunction with one or more translation tables in the gateway to provide the desired degree of security. According to this feature, the internal telephone stations to which access is permitted via Internet telephony, are listed in the translation tables under numbers not comporting with existing hardware or IP addresses. In one preferred instance this may comprise an address or preferably a telephone number for the localized access and security gateway, in addition to an address which may be based on the internal company extension number for the specific telephone terminal. The terminal may not be reached via the Internet for telephony communication in a direct manner using any single address. The terminal may be reached for such a purpose only by first reaching the centralized access gateway and providing to that gateway designated additional information. The receipt of this information will result in the gateway using its translation and filter tables in a novel manner to effect a connection to the telephone station. In this first example that connection would be via a LAN interface to a PBX.

According to a second example or embodiment, digital telephone terminals may be utilized and connected directly to the LAN. Using that arrangement the PBXs may be eliminated. The LAN is connected via one or more LAN interfaces to wire line carrier (T1, T2, T3) links and thence to one or more switching systems in the PSTN. The LAN interfaces include a LAN media access control (LAN-MAC) and physical interface, a LAN transmission control protocol and Internet control stack, a protocol converter, a connection controller and signal transform subsystem, and a wire line carrier interface.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

FIGURES OF DRAWINGS

BEST MODE FOR CARRYING OUT THE INVENTION

Figure 1:
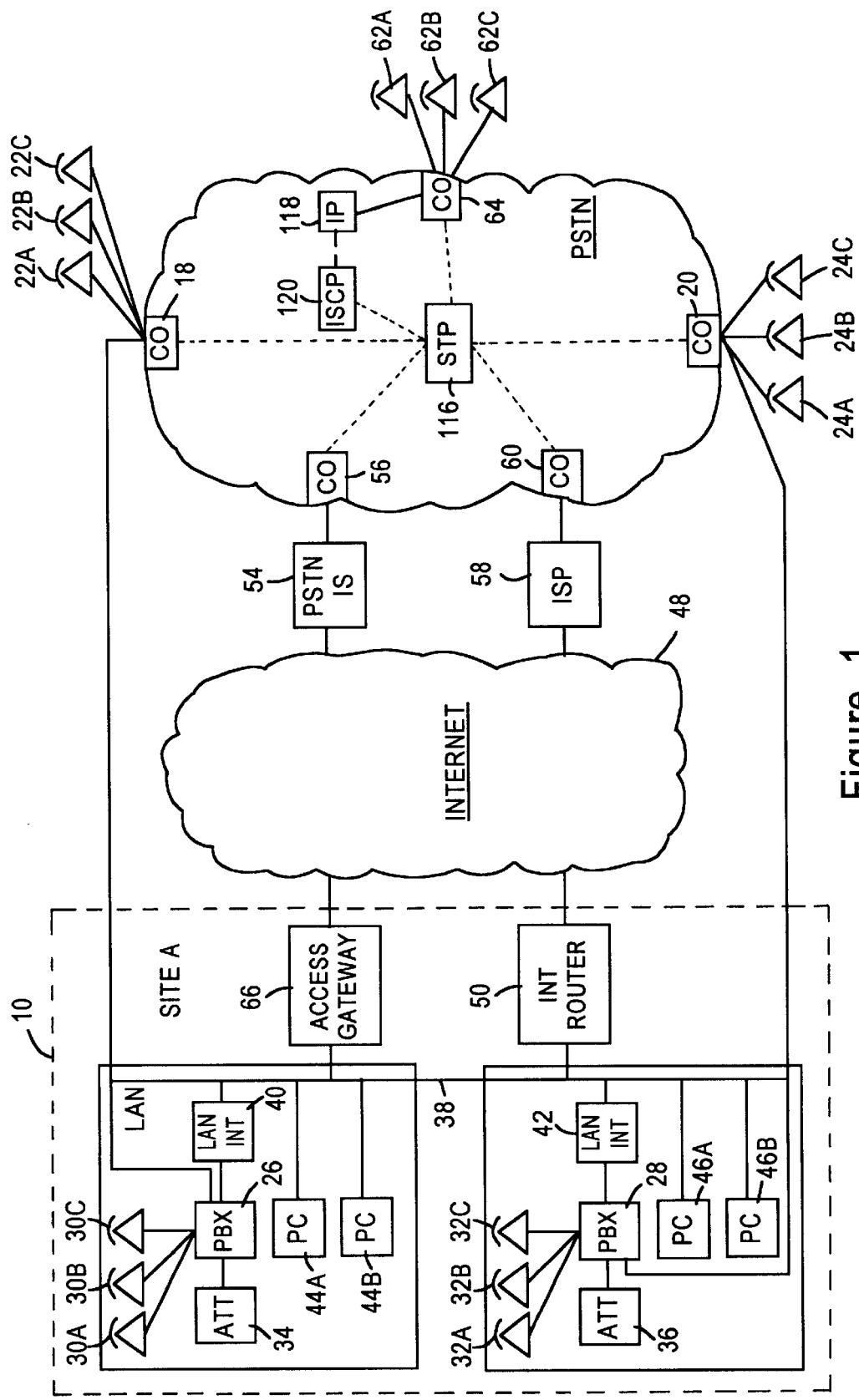
FIG. 1 is a high level block diagram showing the relationship of a localized security and address administration gateway connected to a LAN linked plurality of sites to provide to those sites access to a global telephony link via the public data network known as the Internet in accord with one embodiment of the invention.

Referring to FIG. 1 there is shown a high level block diagram showing the relationship of a localized security gateway connected to a LAN linked plurality of sites to provide to those sites access to a global telephony link via the public data network known as the Internet, according to one embodiment of the invention.

There is shown at 10 two sites A and B of a business establishment which may have additional sites which are not shown. The sites A and B may be relatively contiguous or may be remote, as in different states. Each site is provided with conventional telephone service by a PSTN 12. The two sites are shown connected to the PSTN via lines or trunks 14 and 16 which connect to central offices (COs) 18 and 20. In the drawing the COs 18 and 20 are shown as end offices which serve individual subscriber telephones 22A, B, and C, and 24A, B, and C. The COs are of the type having service switching point (SSP) capability as is presently further explained.

Figure 2:
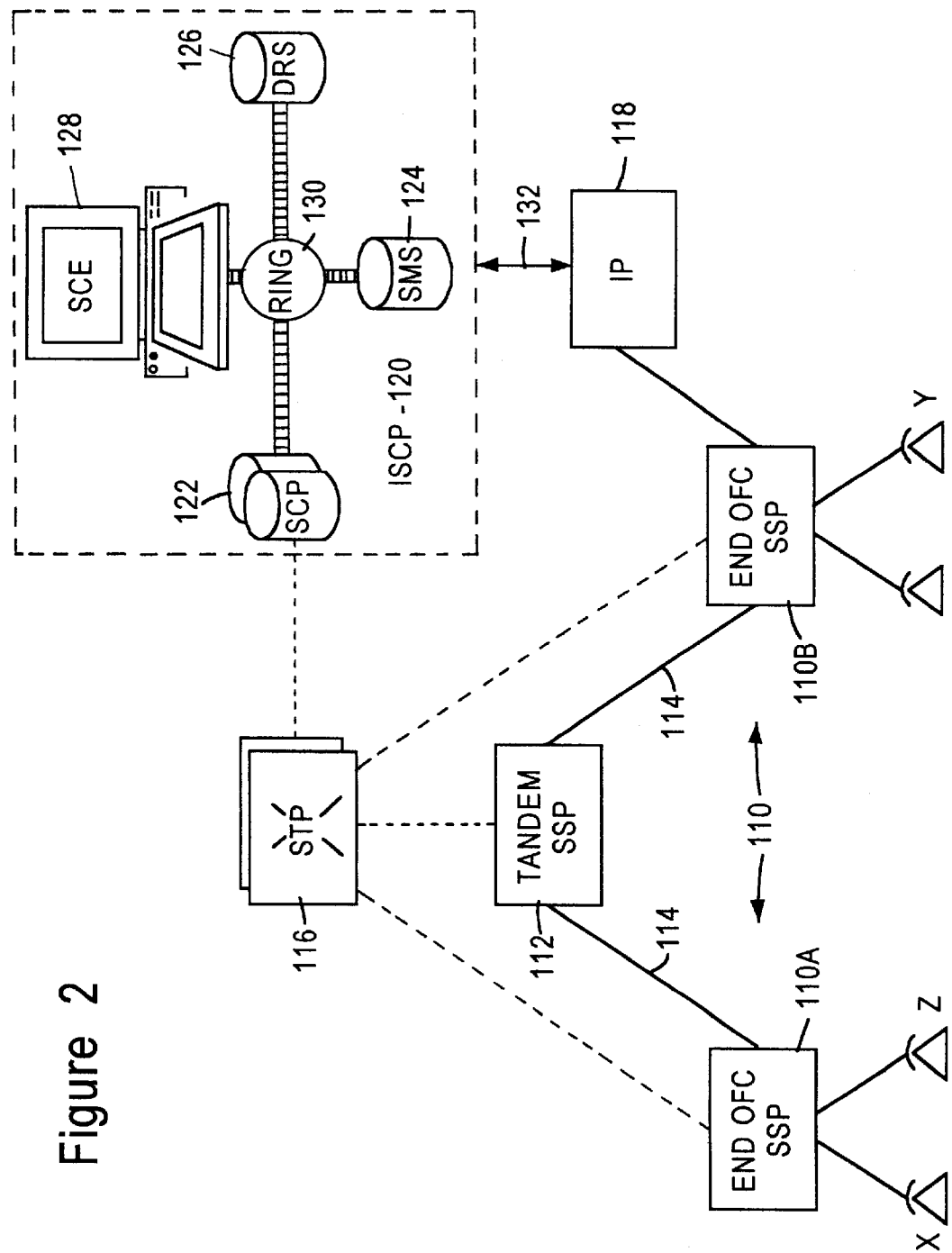
FIG. 2 shows in simplified block diagram form a depiction of a typical switched telephone network having an Advanced Intelligent Network (AIN) common channel interoffice signaling system (CCIS).

The PSTN 12 is preferably of the type having an Advanced Intelligent Network (AIN) control system. A public telecommunications network of that type is shown in FIG. 2. The network shown in FIG. 2 is similar to that shown in U.S. Pat. No. 5,247,571 to Kay et al., the disclosure of which is incorporated in its entirety by reference. The program-controlled nodes or switching systems are sometimes referred to as "AIN nodes" or "AIN elements". The telephone network of FIG. 2 includes a switched traffic network and a common channel signaling network used to carry control signaling and the like between nodes of the switched traffic network.

The network of FIG. 2 includes a number of end office switching systems 110, also referred to as service switching points (SSPs) for reasons discussed later herein. The end office switching systems 110A and 110B provide connections to and from local communication lines (local loops) coupled to end users terminals or equipment.

The end offices 110 are typically connected into a local exchange carrier (LEC) network, typically including one or more tandem switching offices 112 providing trunk connections between end offices. As such, the local exchange carrier network comprises a series of switching offices 110 interconnected by voice grade trunks 114. As known in the art, one or more trunks will typically connect one or more switching offices to at least one switch in other carrier networks (not shown).

Each switching office 110 has at least minimal SS7 signaling capability, which is conventionally referred to as a signaling point (SP) in reference to the SS7 network. In the local exchange network, at least one of the switching offices 110, and preferably all, are programmed to recognize identified events or points in call (PICs). In response to a PIC, the switching office 110 triggers a Transaction Capabilities Applications Protocol (TCAP) query message through the signaling network to an Integrated Service Control Point (ISCP) 120 for instructions relating to AIN type services. Switching offices having the full PIC recognition and signaling capabilities are referred to as service switching points (SSPs).

The ISCP 120 offers AIN routing control functionalities to customers of the local exchange carrier. For example, the ISCP includes an SCP database 122 containing customer profile records (CPRs) for controlling call processing in response to respective triggers. The ISCP 120 may also access a separate database, for example, to supplement its routing tables for certain services. In the preferred system, a second function of the ISCP is to serve as a mediation point. Specifically, the ISCP 120 mediates queries and responses between the local exchange carrier network components and databases operated by other carriers.

The ISCP 120 is an integrated system, and includes a Service Management System (SMS) 124, a Data and Reporting System (DRS) 126, and the database referred to as a Service Control Point (SCP) 122. The ISCP also typically includes a terminal subsystem referred to as a Service Creation Environment or SCE 128 for programming the database in the SCP for the services subscribed to by each individual business customer. The components of the ISCP are connected by an internal, high-speed data network, such as a token ring network 130.

The switches 110 typically comprise programmable digital switches with common channel interoffice signaling (CCIS) communications capabilities. One example of such a switch is a 5ESS type switch manufactured by AT&T, although other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries.

Figure 3:
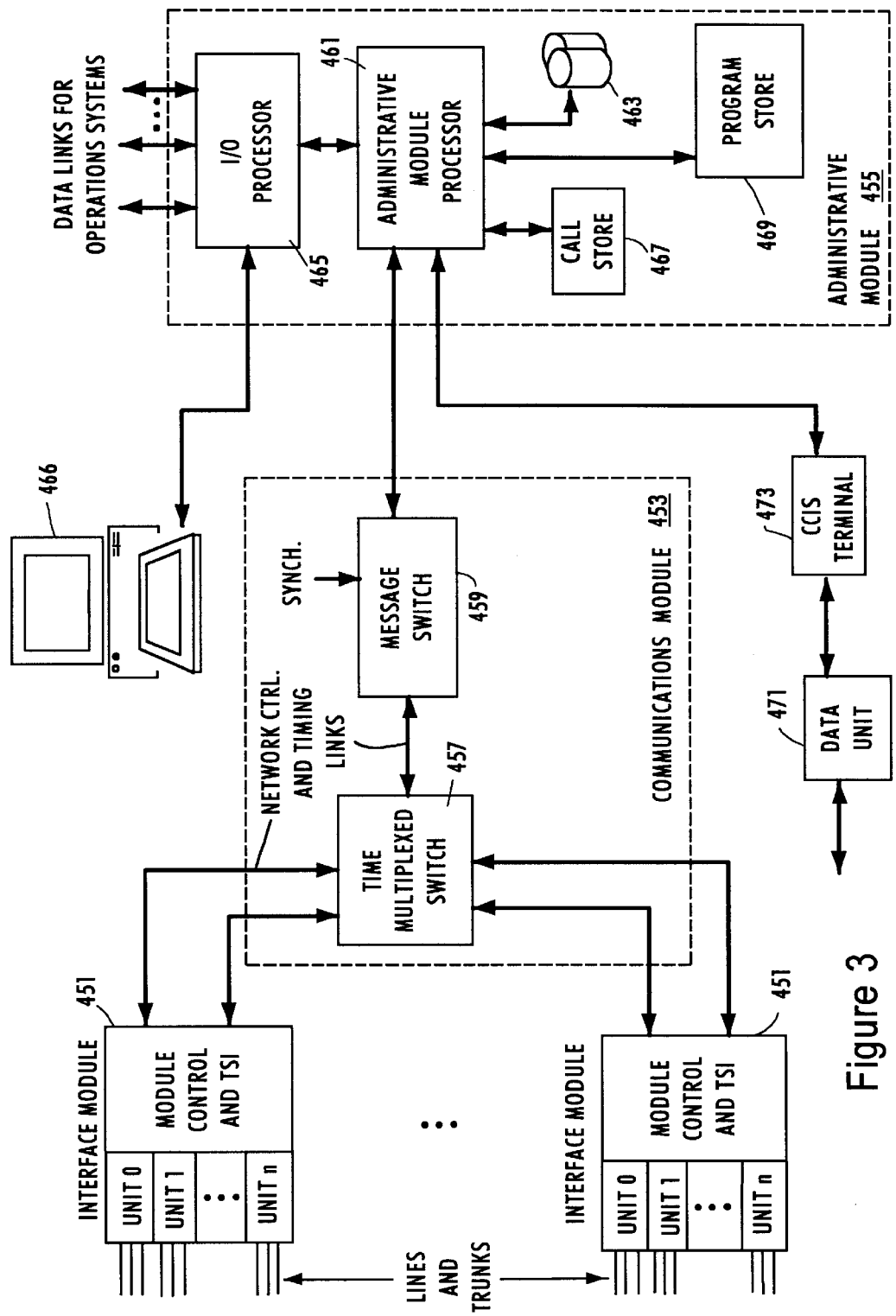
FIG. 3 is a block diagram of a program controlled switch of the type which may be used in the switched telephone network of FIG. 2.

FIG. 3 is a simplified block diagram of an electronic program controlled switch which may be used as any one of the SSP type COs in the system of FIG. 2. As illustrated, the CO switch includes a number of different types of modules. In particular, the illustrated switch includes interface modules 451 (only two of which are shown), a communications module 453, and an administrative module 455.

The interface modules 451 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. Alternatively, the lines or trunks may use digital protocols such as T1 or ISDN. Each interface module 451 also includes a digital service unit (not shown) which is used to generate call progress tones.

Each interface module 451 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 457 and thence to another interface module (intermodule call connection).

The communication module 453 includes the time multiplexed switch 457 and a message switch 459. The time multiplexed switch 457 provides time division transfer of digital voice data packets between voice channels of the interface modules 451 and transfers data messages between the interface modules. The message switch 459 interfaces the administrative module 455 to the time multiplexed switch 457, so as to provide a route through the time multiplexed switch permitting two-way transfer of control related messages between the interface modules 451 and the administrative module 455. In addition, the message switch 459 terminates special data links, for example a link for receiving a synchronization carrier used to maintain digital synchronism.

The administrative module 455 includes an administrative module processor 461, which is a computer equipped with disc storage 463, for overall control of CO operations. The administrative module processor 461 communicates with the interface modules 451 through the communication module 455. The administrative module 455 also includes one or more input/output (I/O) processors 465 providing interfaces to terminal devices for technicians such as shown at 466 in the drawing and data links to operations systems for traffic, billing, maintenance data, etc. A CCIS terminal 473 and an associated data unit 471 provide a signaling link between the administrative module processor 461 and an SS7 network connection to an STP or the like (see FIG. 2), for facilitating call processing signal communications with other CO's and with the ISCP 440.

As illustrated in FIG. 3, the administrative module 455 also includes a call store 467 and a program store 469. Although shown as separate elements for convenience, these are typically implemented as memory elements within the computer serving as the administrative module processor 461. For each call in progress, the call store 467 stores translation information retrieved from disc storage 463 together with routing information and any temporary information needed for processing the call. For example, for a switch based Centrex type service, the call store 467 would receive and store extension number translation information for the business customer corresponding to an off-hook line initiating a call. The program store 469 stores program instructions which direct operations of the computer serving as the administrative module processor.

Referring to FIG. 2, within the local exchange network, the CCIS network includes one or more Signaling Transfer Points (STPs) 116 and data links shown as dotted lines between the STP 116 and the switching offices 110. Typically, STPs 116 are implemented as matching or mated pairs, to provide a high level of redundancy. A full description of such paired STPs is found in Eugene M. Pester III U.S. Pat. No. 5,475,732, issued Dec. 12, 1995, entitled Common Channel Signaling Network Maintenance and Testing. A data link also connects each of the STPs of pair 116 to the ISCP 120. One or more data links also connect the STPs 116 in the local exchange carrier network to mated pairs of STPs in networks of a second carrier (not shown).

The local exchange carrier network may also include one or more intelligent peripherals (IPs) 118. The IP 118 provides enhanced announcement, digit collection, speech recognition, and/or other capabilities as later described. The IP 118 connects to the switch 110 of the local exchange carrier network via an appropriate line circuit capable of carrying both voice and data. The IP 118 also communicates with the ISCP 120 through a data communication network 132 separate from the telephone company switching offices and associated interoffice signaling network. The data communication network 132 is preferably a packet switched network that serves as a signaling network enabling communications between AIN elements including the IP and the ISCP. The network 132 transports messages using a standardized transport protocol, such as TCP/IP, or a generic data interface (GDI), and may be implemented using X.25, frame relay, SMDS, or ATM technologies.

Figure 4:
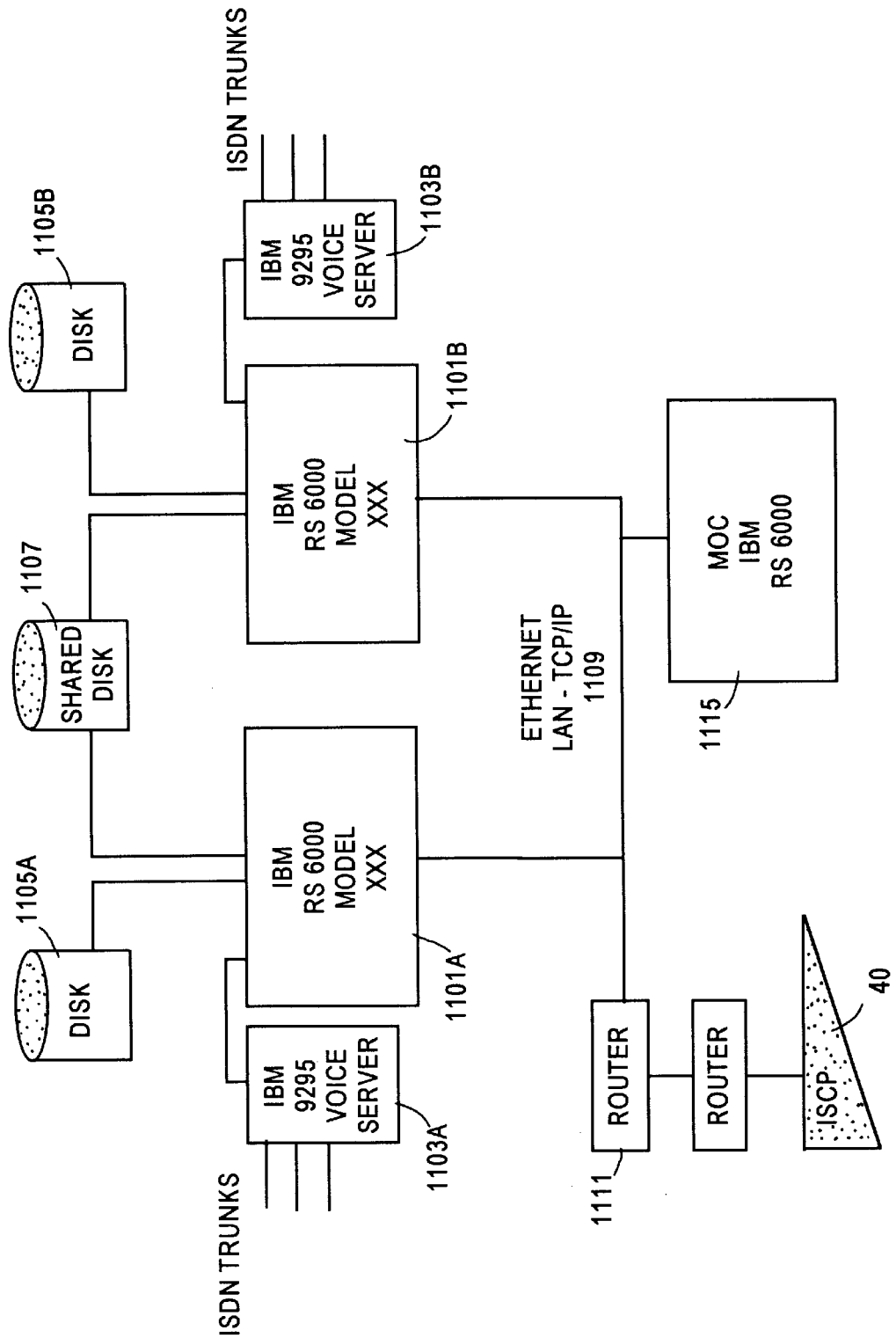
FIG. 4 illustrates one embodiment of an Intelligent Peripheral (IP) platform that may be used in the switched telephone network of FIG. 2.

FIG. 4 illustrates a first, preferred embodiment f the IP used in the network of FIG. 2. In this implementation, the IP will consist of two or more general purpose computers 1101A, 1101B, such as IBM RS-6000's. Each general purpose computer will include a digital voice processing card for sending and receiving speech and other audio frequency signals, such as an IBM D-talk 600. Each voice processing card will connect to a voice server card 1103A or 1103B which provides the actual interface to T1 or primary rate interface ISDN trunks to the SSP type switching office. The plurality of computers may have associated dedicated disk storage 1105A, 1105B, and the IP will included a shared disk memory 1107. Each computer will also include an interface card for providing two-way communications over an internal data communications system, an Ethernet type local area network 1109. The Ethernet carries communications between the individual computers and between the computers and a router which provides an interconnection to the second signaling communications network going to the ISCP. The IP may also include another general purpose computer 1115 configured as a terminal subsystem, for use as a maintenance and operations center (MOC) and providing operations personnel access to the IP. The number of processors provided in the IP and the number of voice servers will depend on project service demands. One additional processor and associated voice server will be provided as a backup.

Each general purpose computer 1101A, 1101B will run a node manager, an IP/ISCP Interface program, appropriate voice processing software and a variety of application software modules to offer the proposed services of the IP. The central administrator or "Node Manager" program module, running on each computer, will monitor and control the various IP resources and operations.

The digital voice processing card and associated software will provide speech synthesis, speech recognition capabilities and DTMF tone signal reception, for use in a number of different applications. The speech synthesis and DTMF tone signal reception, for example will replace the announcement and digit collection functions of the SSP switches in various existing AIN services. The general purpose computers and associated circuits will also run a variety of other types of service program modules, for example a voice mail server module and/or a fax mail server module.

Figure 5:
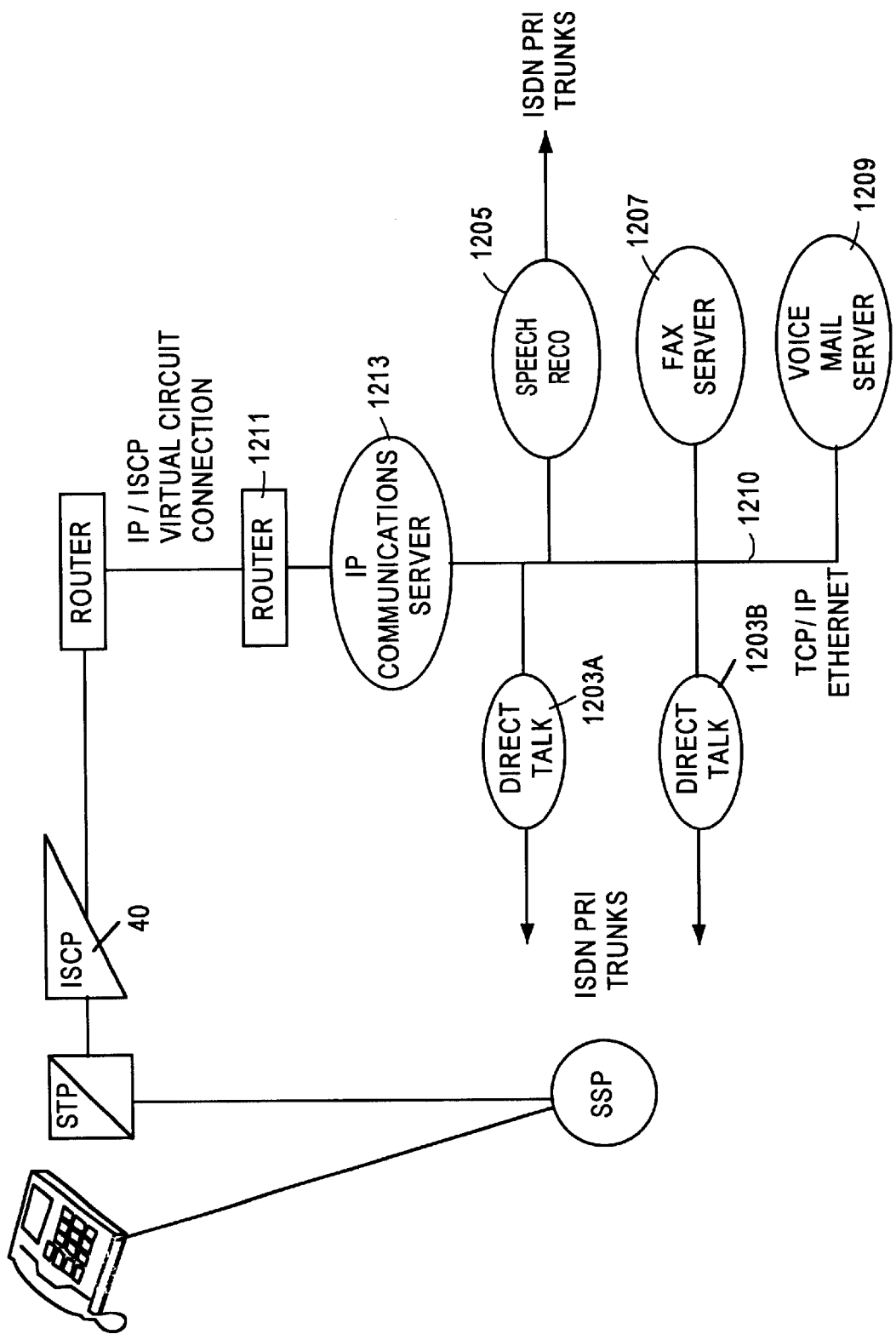
FIG. 5 illustrates another embodiment of an Intelligent Peripheral (IP) platform that may be used in the switched telephone network of FIG. 2.

FIG. 5 illustrates an alternate embodiment of an IP which may be used in the network of FIG. 2. The alternate architecture utilizes separate modules for different types of services or functions, for example, one or two Direct Talk type voice server modules 1203A, 1203B for interfacing the trunk to the SSP, a separate module 1205 for speech recognition, a server module 1209 for voice mail, and another server 1207 for fax mail services, etc. The various modules communicate with one another via an data communication system 1210, which again may be an Ethernet type local area network.

The Direct Talk modules 1203A, 1203B provide voice message transmission and dialed digit collection capabilities, as in the earlier embodiment. The modules 1203A, 1203B also provide line interfaces for communications to and from those servers which do not incorporate line interfaces. For example, for facsimile mail, the Direct Talk module connected to a call would demodulate incoming data and convert the data to a digital format compatible with the internal data communication network 1210. The data would then be transferred over network 1210 to the fax server 1207. For outgoing facsimile transmission, the server 1207 would transfer the data to one of the Direct Talk modules over the network 1210. The Direct Talk module would reformat and/or modulate the data as appropriate for transmission over the ISDN link to the SSP. The Direct Talk modules provide a similar interface function for the other servers, such as the voice mail server 1209.

The illustrated IP also includes a communication server 1213. The communication server 1213 connects between the data communication system 1210 and the router 1211 which provides communications access to the second signaling communication system and the ISCP 40 and other IPs which connect to that signaling communication system. The communication server 1213 controls communications between the modules within the IP and the second signaling communication system.

In each of the proposed architectures, the SSP switch would route calls to the different elements of the IP in response to instructions from the ISCP. In the initial implementation using general purpose computers, each of which offers all service functionalities, the decision to route to a particular one of the computers would be a resource availability/allocation decision. If necessary data can be exchanged between the computers via the internal data communications network, e.g., if a message for a particular subscriber's service is stored in the disc memory associated with one computer but the other computer is actually processing the call. In the second implementation (FIG. 6), however, the ISCP would instruct the SSP to route the call to the particular line to the specific module capable of providing a calling customer's individual service. For example, if the subscriber has some form of speech recognition service, the call would be routed to the speech recognition module 1205. If the subscriber has a voice mail service, however, the ISCP would instruct the SSP to route the call to one of the lines going to one of the voice server modules 1203A, 1203B. The module 1203A, or 1203B would receive outgoing voice messages from the voice mail server 1209 for transmission to the caller. The module 1203A or 1203B would decode DTMF signals and supply appropriate data to the voice mail server, for control purposes. The module 1203A or 1203B would also format incoming voice messages for transmission over internal network 1210 and storage by server 1209.

According to one preferred embodiment of the invention the IPs may communicate with the ISCP using a proprietary protocol +1129 developed for the project described in U.S. Pat. No. 5,572,583, issued Nov. 5, 1996, to Wheeler and Farris, entitled Advanced Intelligent Network With Intelligent Peripherals Interfaced to the Integrated Services Control Point, and assigned to the assignee of the instant application, the IP will query ISCP in response to a call. As will be described in further detail, during a call a trigger event occurs. The SSP thereupon queries the ISCP. The ISCP responds by instructing the SSP to route the call to the IP, using standard TCAP protocol messages. Substantially simultaneously the ISCP uses the +1129 protocol on the second signaling network to send to the IP, one or a sequence of instructions as to how to process the particular call which is sent by the SSP.

As an alternative or in addition to the +1129 protocol, communications between the IP and the ISCP may utilize generic data interface (GDI). The GDI command set is simpler and more generic, and the commands can carry more data. Also, the ISCP can initiate communications using GDI. This permits a wider variety of routing and processing routines. In response to a triggering event, the SSP would again receive instructions to route a call in progress to the IP. However, rather than waiting for a subsequent query from the IP, while the SSP is routing the call the ISCP may instruct the IP to prepare to receive a call on a particular circuit and may forward additional call specific information. For example, for a call which might require speech recognition processing, the ISCP would instruct the IP to retrieve appropriate recognition templates from memory. Other protocols could be used to permit either the ISCP or the IP to initiate communications.

Referring to FIG. 2, the end office switching system 110 normally responds to a service request on a local communication line connected thereto, for example an off-hook from station X followed by dialed digit information, to selectively connect the requesting line to another selected local communication line, for example to the line to station Z. The connection can be made locally through only the connected end office switching system 110A but typically will go through a number of switching systems.

In the normal call processing, the central office switching system 110 responds to an off-hook and receives dialed digits from the calling station. The central office switching system analyzes the received digits to determine if the call is local or not. If the called station is local and the call can be completed through the one central office (intraoffice call), e.g., from calling station X to called station Z via the central office 110A, the central office switching system connects the calling station to the called station. If, however, the called station is not local, e.g., from calling station Y to called station Z, the call must be completed through one or more distant central offices (interoffice call), and further processing is necessary. If at this point the call were connected serially through the trunks and appropriate central offices between the caller and the called party using in-band signaling, the trunks would be engaged before a determination is made that the called line is available or busy. Particularly if the called line is busy, this would unnecessarily tie up limited voice trunk circuit capacity. The CCIS system through the STPs was developed to alleviate this problem.

In the CCIS type call processing method, the originating end office switching system suspends the call and sends a message through the CCIS network to the end office switching system serving the destination telephone line. The terminating end office determines whether or not the called station is busy. If the called station is busy, the terminating end office so informs the originating end office via CCIS message, and the originating end office provides a busy signal to the calling station. If the called station is not busy, the terminating end office so informs the originating end office. The originating office provides ringback to the caller, and the terminating office applies ringing current to the line to the called party. When the telephone station connected to the called line goes off-hook, the terminating switching office informs the originating switching office, and the two offices establish a telephone connection via the trunks and end offices (and/or tandem offices) of the network between the calling and called stations.

For an AIN type service, such as call redirection based on data stored in the ISCP 120, the end offices and/or tandems are SSP capable and detect one of a number of call processing events, each identified as a "point in call" (PIC), to trigger AIN type processing. Specifically, in response to such a PIC, a switching system such as switch 110 suspends call processing, compiles a call data message, also referred to as a TCAP query message, and forwards that message via common channel interoffice signaling (CCIS) links and one or more STPs 116 to an ISCP 120. If needed, the ISCP 120 can instruct the particular switching office to obtain and forward additional information. Once sufficient information has reached the ISCP 120, the ISCP 120 accesses its stored data tables and or data in external databases to translate the received data into a call control message and returns the call control message to the switching office via the STP 116 and the appropriate CCIS links. The switching office 110 uses the call control message to complete the particular call through the public switched network in the manner specified by the subscriber's data file in the ISCP 120.

Referring to FIG. 1, the business establishment terminations of the lines or trunks 14 and 16 are connected to PBXs or PABXs 26 and 28 at the sites A and B, respectively. These PBXs serve the internal telephone stations 30A, B, and C, and 32A, B, and C, respectively to provide both internal and external telephone service to the sites A and B. Each PBX is provided with an attendants station 34 and 36.

The sites A and B (and any other sites in the business establishment) are also connected by a local area network LAN 38. The LAN 38 is connected to the respective PBXs through LAN interface cards or units 40 and 42. The LAN cards provide a two-way data interface compatible with the particular LAN 38, for example a 10 baseT Ethernet LAN. The LAN card transmits and receives addressable messages over the LAN 38 for communication with other devices on the LAN. The addressing conforms to the media access control (MAC) functionality of the particular LAN protocol.

FIG. 1 shows the LAN also connected to PCs or work stations 44A and B, and 46A and B, respectively. The various PCs or work stations include processors, memories, various disc drives, etc. Each of the PCs also includes a display or monitor, a keyboard, and possibly one or more additional user input devices (not shown) such as a mouse, joystick or track ball. Typically, the software running on the PCs includes an operating system, such as Windows '95, and a series of compatible applications programs running under the operating system. The software preferably implements a graphical user interface, including a user interface for communications through the public packet data network or Internet 48.

The PCs or work stations are provided with access to the Internet by an Internet access server 50 which may be connected to an Internet router (not shown) via a T1 or higher capacity line 51. The server 50 may be equipped and programmed to act as a firewall for the PC or work station traffic.

The LAN 38 may use any appropriate local data communication network technology. For example, the network may be fiber or wire. The network 38 may be a local ATM (Asynchronous Transfer Mode) network or a token ring, etc. The LAN also carries normal data communications between PCs such as 44 and 46 and any other data devices coupled to the LAN, such as the Internet 48.

One or more of the PCs or work stations 44 and 46 may also have voice communication capabilities. Such PCs would include a microphone and one or more speakers. These PCs also include analog to digital and digital to analog converters, and the CPUs in such PCs run software for compression and decompression of digitized audio (typically voice) information. The software also processes the audio information for transmission and reception of the compressed digital information in IP packets and using the appropriate protocol, for communication with the respective access server, such as the access server 50 in FIG. 1.

PCs having voice communication capabilities can conduct two-way, real-time audio communications with each other, in a manner directly analogous to a two-way telephone conversation. However, the actual signals exchanged between two such terminal devices go through the public packet data network 48 and the appropriate access server 50. In this manner the appropriately equipped PCs in the business establishment 10 may communicate by telephone with distant similarly equipped PCs (not shown). Typically, such communications at least bypass long distance interexchange carriers. If both communicating PCs connect to the Internet via a LAN or other data network, the audio communications may not utilize any public telephone network. On the other hand, individual residence premised PC users usually rely on dial-up connection to an ISP connected to the PSTN.

The public packet data network or Internet 48 also connects to a number of PSTN gateways or servers in different service areas. Thus a PSTN gateway 54 connects to one or more central offices 56 of the public switched telephone network in the region where the gateway 54 is located. In similar fashion one or more ISP gateways 58 is shown connected from an Internet router (not shown) in the Internet 48 to one or more central offices 60 in the PSTN 12. Calls through the network to and from such gateways typically bypass long distance interexchange carriers and may utilize a data network connection to a PC at one end of the call, as in the example of the PCs in the business establishment 10. The PCs having voice communication capabilities may send and receive telephone calls via the public switched telephone network 12 and one of the gateways 54 and 58 to persons using standard telephones 62A, B, and C connected to an end office CO in the PSTN 12.

Such gateways as 54 and 58 will connect to the CO, typically utilizing one or more primary rate interface (PRI) type integrated services digital network (ISDN) line groups or a combination of one or more T1 circuits and a Simplified Message Desk Interface (SMDI) type signaling circuit. The line circuits provide digital line interconnections of the gateway to the central office. The D channel of the PRI or the SMDI link carries a variety signaling back and forth between the PSTN gateway and the CO. For example, on an incoming call from one of the COs 56 or 60, to one of the gateways 54 or 58, the signaling would include the calling party number and dialed destination digits.

The PSTN gateway 54 includes one or more computers for processing individual calls. The computers include appropriate line interfaces for answering incoming calls and initiating outgoing calls over the particular type of line circuits. The interfaces also receive and decode standard signaling messages from the PSTN, e.g. DTMF dialing signals and/or D channel ISDN signaling. The interfaces also detect line status and call progress signals on incoming and outgoing calls, either as in-band tone signals or as D channel messages. Each of the computers in the gateway 54 runs software to compress incoming audio signals from the PSTN in a standardized format and decompress digital audio signals in that format received via the public packet data network or Internet 48, for transmission over the PSTN. The computer(s) also perform the two-way protocol processing to send and receive compressed, digitized voice data in TCP/IP packet form over the network 48. Copending commonly assigned application Ser. No. 08/634,543 filed Apr. 18, 1996 describes several implementations of "Internet Modules" which may serve as alternate embodiments of the PSTN gateways 54 and 58.

Communications via the public packet data network or Internet 48, utilize IP protocol addressing. It may be helpful in understanding later discussed call processing examples to take a moment here to review the fundamentals of IP addressing. Each IP address comprises a series of four numbers separated by dots. An example of an IP address would be 164.109.211.237. Each machine on the Internet has a unique number permanently or temporarily assigned to it which constitutes one of these four numbers. In the IP address, the leftmost number has the greatest weight. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router.

When a packet bearing a destination address leaves a source router, the router examines the first two numbers in a matrix table to determine how many hops are the minimum to get to the destination. It then sends the packet to the next router as determined from that table, and the procedure is repeated. Each router has a database table that finds the information automatically. This continues until the packet arrives at the destination computer. The separate packets that constitute a message may not travel the same path depending on traffic load. However, they all reach the same destination and are assembled in their original order in a connectionless fashion. This is in contrast to connection oriented routing modes, such as frame relay and asynchronous transfer mode (ATM) or voice.

It would be difficult for most people to remember the four separate numbers (sometimes having ten or more digits) comprising each numeric IP address. In addition numeric IP addresses occasionally change or some systems temporarily assign IP addresses to active devices, making it even more of a problem for people to keep track of them. To facilitate person to person communications, however, people can address each other using easier to remember names. In relation to the present invention these names are preferably textual domain names or telephone number based domain names. A domain name server (DNS) system 51 translates the names into actual IP addresses.

An example of a textual Domain Name is BUBMI@HUT.MB.COM. Each of the names separated by a dot is called a domain. The significance of each of the domains is the reverse of that of the numeric IP address. In the numeric IP address, the most significant numbers were on the left and the least significant on the right. The textual Domain Name System begins with the least significant on the left and proceeds to the most significant on the right. An example of a telephone number based Domain Name is "301-608-2908@phone".

The top-level domains, those of the most general significance, are as follows:

1. COM—A commercial operation.
2. EDU—A university, college or other educational institution.
3. GOV—A government organization.
4. MIL—A military site.
5. ORG—Any organization that does not fit into any of the preceding.
6. NET—A network.

There are now two-letter domains, each denoting a different country, which are atop the above original domain names. An address ending in "COM.AU," for example, would be a commercial operation in Australia. Over a hundred different countries are now connected to the Internet so the list of two-letter country codes is long and getting longer. Computers or servers associated with the Internet convert textual domain names into numeric IP addresses.

In the example illustrated in FIG. 1, the domain name server 52 translates domain names into numeric IP addresses in response to requests from calling terminals. FIG. 1 depicts a single domain name server 52, and the discussion herein concentrates on a single server implementation for ease of explanation. In an actual, large scale deployment, the domain name server system would comprise a number of server systems 52 in a hierarchical arrangement. Each domain name server 52 would serve a region or segment of the public packet data network 48 and would provide translations and processing of names corresponding to addresses residing within the segment served. Any computer or PC on the segment requesting translation would first query the domain name server system 52 serving that segment. If the domain name was not one associated with the server, the domain name server 52 would communicate through the hierarchy of such servers to relay the query to the appropriate server for processing; and after processing, that server would provide the destination address and any associated information in the reply back to the querying device. Also, each domain name server 52 in a given area could be duplicated, for redundancy.

There is now described a typical Internet telephone call from an outside telephone to the internal telephone of an employee of the business establishment 10.

An external caller at telephone 62A in a distant city has been invited by an employee of the business * establishment 10 to call him using the Internet telephony capability that the business provides. The external caller has been further told by the employee that in order to complete an Internet telephone call to him at his desk from a telephone connected to the PSTN, she is to dial the prefix WW which has been established by the PSTN as a prefix to be used to dial an Internet call.

The potential caller has been additionally instructed to use that prefix and the number INT-123-4567 as a number which will establish a connection through the Internet to the access gateway 66 of the business establishment 10. The SSPs associated with the end office switches in the PSTN 12 have originating triggers set for that number. When the number INT-123-4567 is dialed, the trigger in the originating CO/SSP 64 suspends the call and sends a TCAP query message via one or more STPs to the ISCP. The ISCP consults a database of translations for Internet calls and ascertains that the number INT-123-4567 identifies the access gateway 66, and that the domain name of that gateway is '703-123-4567@phone'. The database of translations of INT prefixed telephone numbers to Internet domain names may be maintained either in the ISCP or the IP.

As an alternative to the foregoing procedure, the employee may instruct the potential caller to use the 'INT' prefix and then to follow the instructions which will be provided by voice prompt. According to this embodiment the employee also divulges to the potential caller the domain name of the access gateway 66, namely, '703-123-4567@phone'. According to this variant procedure the ISCP, in response to the prefix 'INT', would set up a voice recognition session using the voice recognition capabilities of the IP. The IP may be signaled by the ISCP to initiate such a session with the caller.

The IP thereupon transmits to the caller via a voice link between the IP and the SSP/CO to which the caller is connected, a voice prompt requesting the caller to spell the domain name of the destination desired. The caller complies with this request and the domain name '703-123-4567@phone' is temporarily stored by the IP. The IP or the ISCP thereupon sends the domain name via the CCIS network in the PSTN 12 to the end office CO 56 with instructions to establish a link to the access gateway 66 which that domain name identifies. As an alternative to this transmission of the domain name to the CO 56, the ISCP could direct that a voice link from CO 64 to CO 56 be established at the outset, whereby the domain name is delivered from the IP via the voice link.

In its search the ISCP (or the IP) has further ascertained from its database routing tables that the Internet gateway 54 of the PSTN may be used to contact the access gateway 66 via a no-toll routing through the PSTN to the end office CO 56.

The availability of a dial-up connection from CO 56 to a line to the PSTN Internet gateway 54 is next established via the CCIS network. Assuming that the CCIS query shows that a line is available, connection is then made between the end offices 64 and 56, and from end office 56 to the PSTN Internet gateway 54. The end office CO 56 thereupon sends the domain name of the PSTN Internet gateway 54. The gateway 54 in turn sends the domain name to the domain name server or DNS 52 with a request for a domain name to IP address translation. The DNS 52 establishes the proper translation from its database (or a related hierarchical database), and returns the numerical IP address of the access gateway 66 to the PSTN Internet gateway 54. The Internet gateway or server 54 then uses this IP address and establishes a virtual Internet connection between the access gateway 66 and the CO 64.

The access gateway 66 responds to this connection by requesting that the end office CO 64 (or the IP) send to the caller a prerecorded prompt to send the telephone DID number of the party (or terminal) that the caller is attempting to reach. This is accomplished either by DTMF signaling or by voice and the voice recognition capability in the Intelligent Peripheral (IP) platform in the PSTN. The caller sends the requested number to the access gateway 66 via the PSTN 12 and the Internet 48. The access gateway 66 also receives via CCIS and IP signaling the telephone number of the calling party, which may be obtained from ANI or caller ID (or request to the calling party) The access gateway 66 thereupon commences its security function as is now explained.

The system and methodology just described has resulted in the initiation of two security measures to this point in the procedure. Thus the employee first disclosed his DID number, and second, the employee disclosed either the Internet number INT-123-4567 and/or the domain name '703-123-4567@phone' for the access gateway to the business establishment. These numbers have been used to connect to the access gateway 66 and the DID number has been presented to the access gateway 66.

The architecture and operation of the access gateway 66 is now described.

Figure 6:
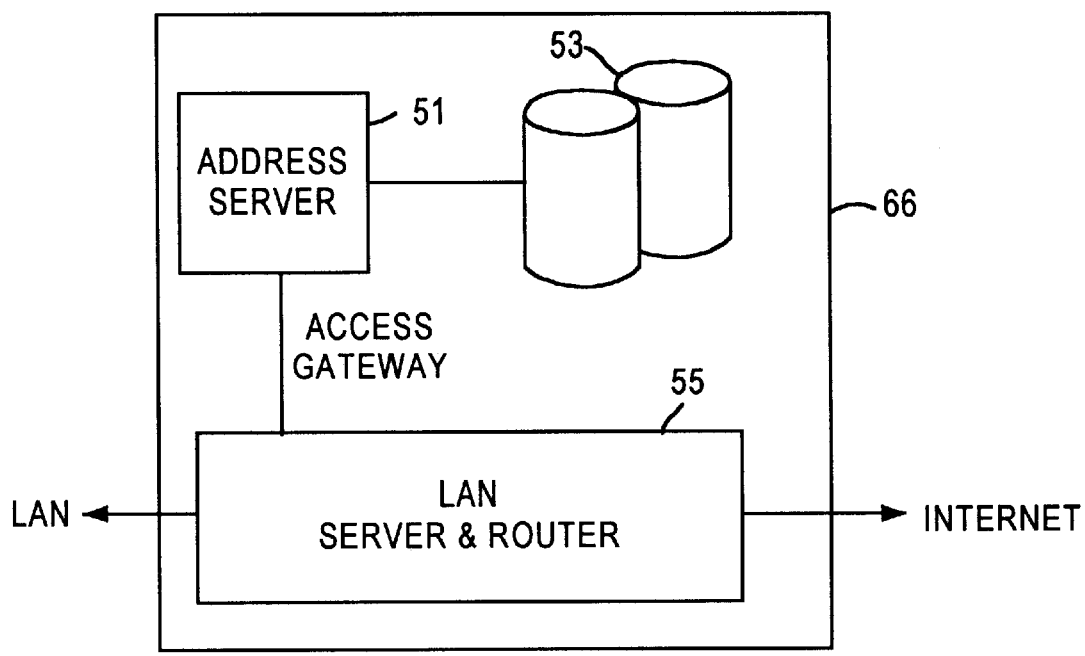
FIG. 6 is a simplified block diagram of a preferred embodiment of access and security gateway to provide public packet switched data network, such as the Internet, telephony service to the business establishment shown in FIG. 1.

As shown in simplified form in FIG. 6, the access gateway 66 comprises a LAN server and router 55 interfacing between the LAN and the Internet. The access gateway also includes an address or security server 51. These two servers may have a common central processing unit (CPU), if desired. The address server 51 also includes a data storage system 53 wherein there is stored a series of databases. This data storage system may be either associated with or included in the server 51. As discussed more below, the databases include look-up tables for authentication of and/or translations of names or numbers, and routing control records for conditional as well as parallel processing of requests for communication via the access gateway.

Figure 7:
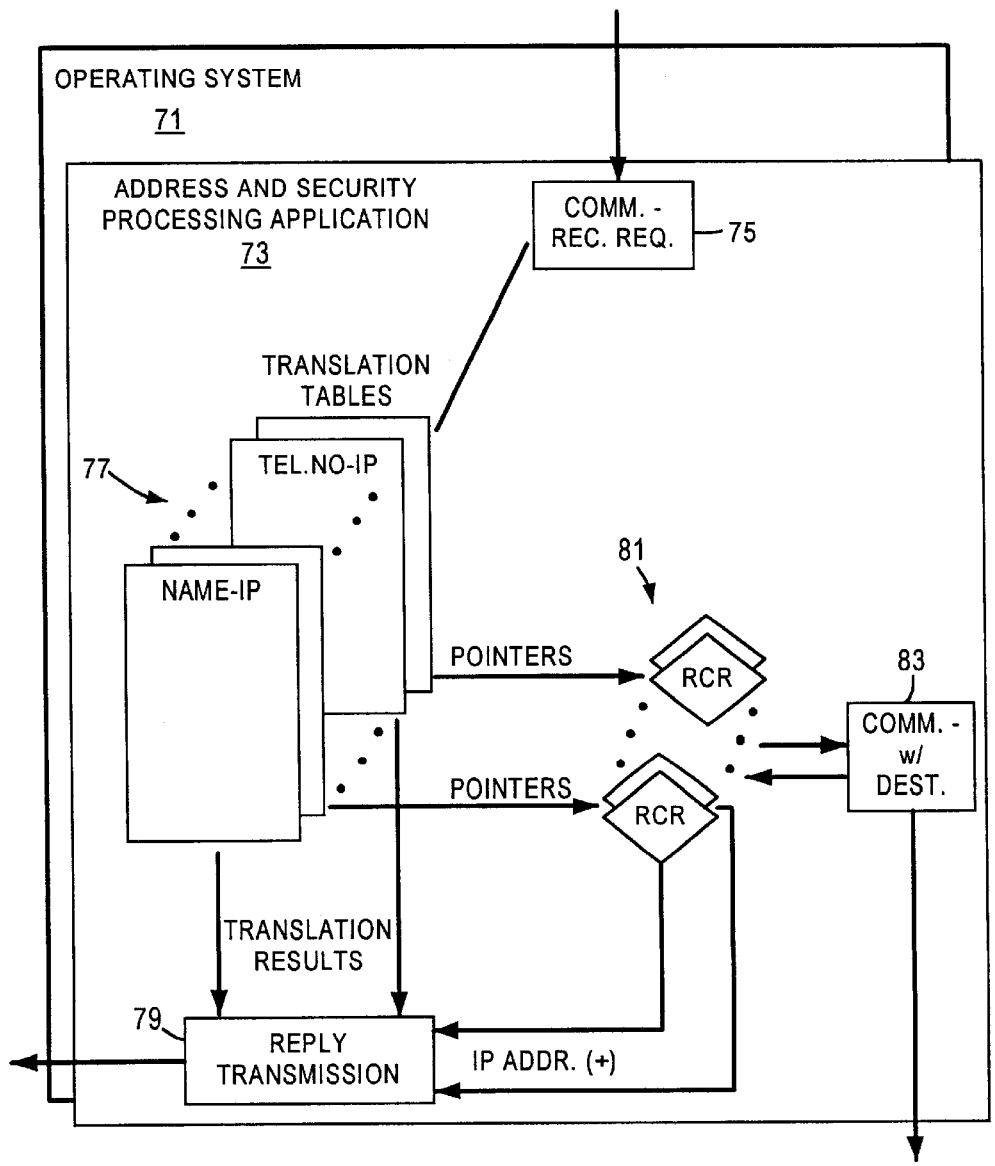
FIG. 7 is a simplified illustration of an example of one possible organization of software for the address server or address and security gateway illustrated in FIG. 6.

FIG. 7 provides a simplified illustration of an example of one possible organization of the software for the address server 51, for implementing the security operations in accord with the present invention. The computer of the address server runs a standard operating system 71, such as UNIX. The operating system facilitates execution of one or more applications. One of the applications that will run on the computer of the address server 51 is an address processing application 73. The address processing application 73 includes executable code facilitating the actual processing. The executable code permits access to translation tables 77 and routing control records (RCRs) 81 stored in a database within the storage system portion of the address server 51. The executable code of application 73 also triggers several communication routines 75, 79 and 83.

More specifically, when the computer of the address server 51 receives a "query" or request for translation or database look-up, the operating system 71 passes the request from the LAN server and router interface 55, to the communication routine 75 of the application 73 running in the server 51. The communication routine extracts the appropriate information from the query message, such as the address or number of the requesting terminal device and the designation that the terminal device has identified for translation or look-up.

The address or designation processing application 73 can access a number of translation tables. Some of the tables will translate addresses, numbers, or designations into immediate connect commands from the server 51 to the LAN server and router 55. One type of designation which would require access to this type of table is a DID number for a called party in the business establishment, for which the lowest level of security has been set. Other tables will translate designations such as DID numbers into identification of supplemental tables to be used to effectuate a higher security level. Such supplemental tables would contain additional requirements to be satisfied before a connect command is sent from the server 51 to the LAN server and router 55. One example of such an additional table would be a table of telephone numbers of authorized calling terminals for the particular DID number which is being called. Only after verification that the calling number is authorized would a connect command be sent from the server 51 to the LAN server and router 55.

Certain translations will involve conditional analysis processing for at least some called numbers or addresses. In such a case the result of the translation will be to call up a communication routine 79 for transmission of a reply message to the calling terminal device that requested the translation or look-up processing. The application 73 also provides the address of that terminal device to the reply transmission routine 79. In response, the routine 79 will formulate an IP reply message containing the querying terminal device address as the destination address and containing the IP address produced by the translation process as message data. The reply transmission routine 79 forwards the message through operating system 71 and the IP interface (LAN server and router) for transmission through the public packet data network 48 to the requesting terminal device. The requesting terminal device then responds using the provided IP address as a destination address and the response is again processed for authentication by comparison with the content of the appropriate tables. The required response may be a PIN number, a name, a password, or the like. This routine may be repeated to any desired number of stages depending upon the degree of security desired for the called terminal on a called terminal by terminal basis. Upon satisfying all of the indicated requirements, the connect command is sent to the LAN server and router to initiate the desired communication.

Parties (terminals) for whom such additional or conditional processing is established will store a routing control record (RCR) 81. For each calling terminal associated with such a called terminal, the translation tables 77 will store a pointer pointing to the routing control record (RCR) 81 that controls that called party's routing service to his or her called terminal in the business establishment. In operation, the address processing application 73 will receive a query in the manner discussed above. However, when the application accesses the translation table with the designation associated with a called party (terminal) having conditional analysis based service, the translation will return a pointer identifying the controlling RCR. The addressing processing application 73 then executes a conditional analysis routine utilizing the identified RCR 81. The conditional analyses defined by the RCRs vary considerably, depending on the customized routing service selected for each of the terminals in the business establishment. Several simple examples are described for convenience.

In one exemplary form, the RCR specifies a set of conditions or criteria and two or more alternate destinations, depending on which criteria are satisfied by the current call or translation request query. For example, the RCR may specify alternate destination addresses for different times, or for different addresses of calling terminal that placed the call and thereby requested the translation. In these cases, the address processing application 73 compares call or query related parameters to the criteria in the RCR 81 and obtains the destination address and processing procedure corresponding to the parameters of the current call or translation query. Here, the address may be an IP address, a MAC address, a telephone or terminal number, other routing information (e.g., telephone number) or a combination of an address plus some other routing information.

The address or designation processing application 73 will supply the result from the RCR processing (address and/or other routing information) to the communication routine 79. The transmission reply routine transmits a reply message to the terminal device that requested the translation, in the manner discussed above. However, in this case, the reply message contains the IP address and/or other routing information obtained from the RCR processing. The requesting terminal device initiates the desired communication in the normal manner but using the address information and satisfying the protection routine obtained as a result of the conditional analysis. In this manner, the communication ultimately goes to the destination selected by the called party who established the customized routing service and the corresponding RCR in the domain name server 51.

The conditional processing by the address server 51 will support a wide array of selective routing services, such as routing to different destinations at different times, routing to an alternate destination if a primary destination is inactive, follow-me type service, etc. The procedure permits a company using the system to require callers to create a designated voice recognition template in order to qualify for subsequent use of the Internet telephony connection which is offered. The methodology also may be programmed to flag and initiate fraud investigations.

Figure 8:
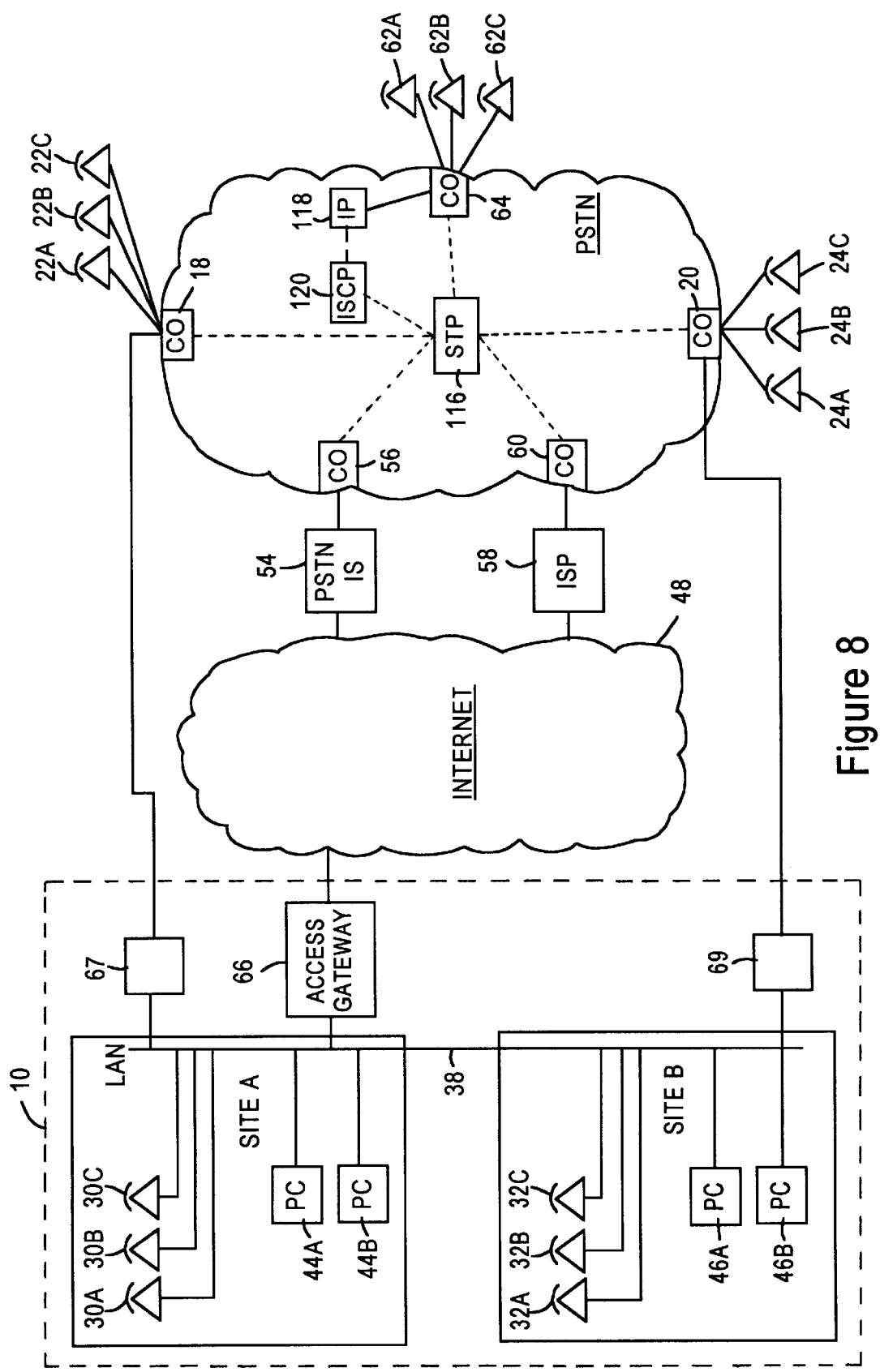
FIG. 8 is a high level block diagram showing another embodiment of a localized security and address administration gateway connected to a LAN linked plurality of sites to provide to those sites access to a global telephony link via the public data network known as the Internet.
Figure 9:
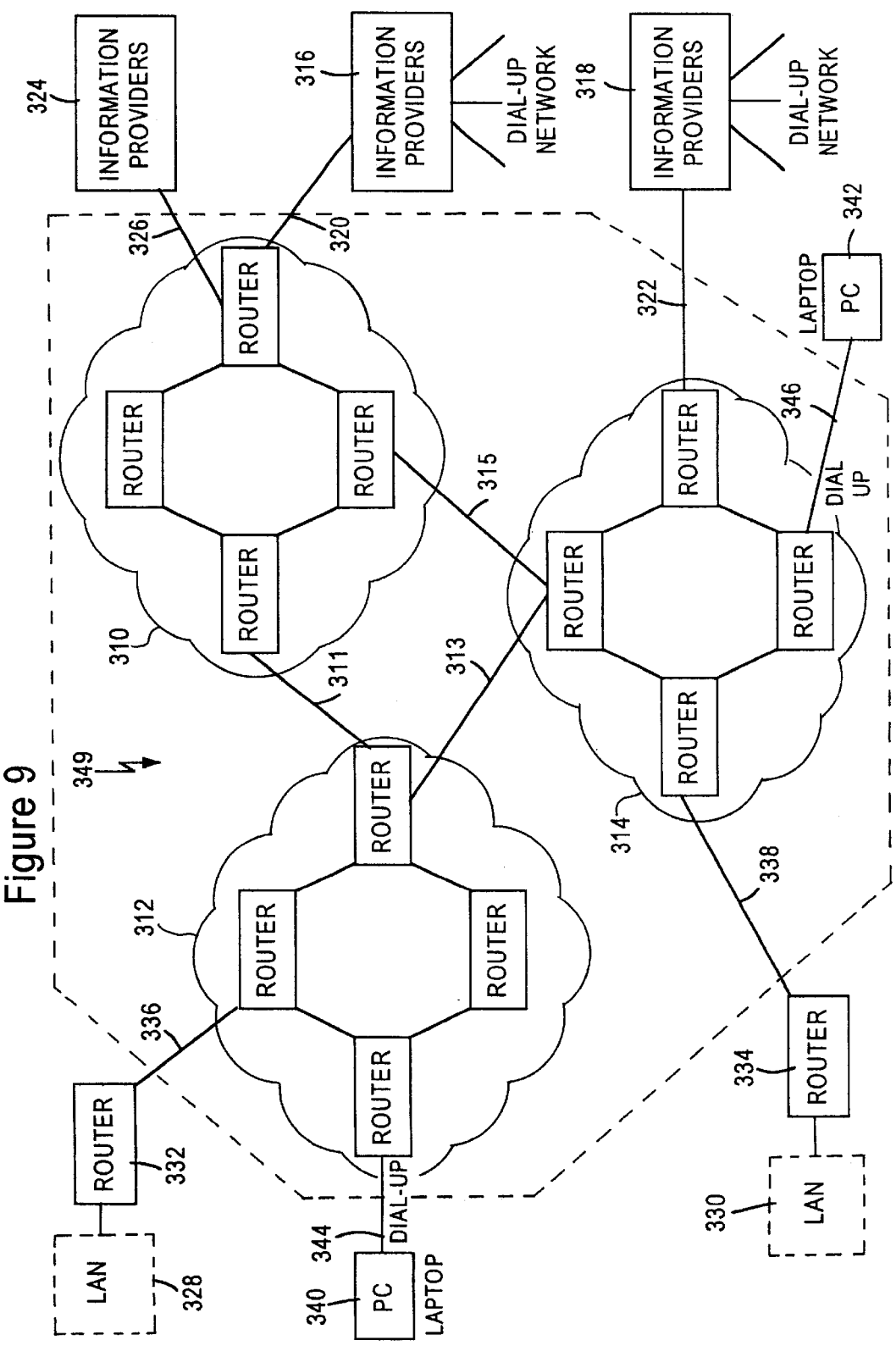
FIG. 9 is a functional block diagram illustration of the public packet data network known as the Internet.

In the embodiment of the invention shown in FIG. 1 using PBX distribution, satisfaction of the security procedures is followed by connect command and the DID telephone number of the called party is then transmitted via the access gateway 66 to the PBX. The PBX uses the telephone number to ring the desk of the called employee and, if the employee goes off-hook, the call is completed from the calling to the called party through the Internet. In the alternate embodiment such as illustrated in FIG. 8 the address which is delivered to effect the connection would be the LAN address for the called terminal.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of telephony communication via a public packet switched data network from a first terminal to a second terminal connected to a local area network comprising the steps of:

a) initiating from said first terminal a first address signal;

b) translating said first address signal to a second address signal to effect a link to a first interface to said public data switched network;

c) establishing a virtual link through said public data switched network to a second interface to said public data switched network;

d) establishing a packet data link from said second interface to said public data switched network to an access gateway to said local area network;

e) transmitting from said second interface to said public packet switched data network to said access gateway a designation including information initiated by said first terminal, which information includes identification of said second terminal;

f) comparing the information provided by said first terminal with a storage of information maintained by said access gateway which includes information relating to said second terminal;

g) upon establishing a match between at least certain of said information provided by said first terminal and information stored in said storage relating to said second terminal, linking said first terminal to said second terminal through said public packet switched data network and said access gateway and said local area network for interactive voice telephony communication between said first and second stations.

2. A method according to claim 1 wherein said first and second terminals are telephone terminals.

3. A method according to claim 2 including the step of connecting said local area network to said second terminal through a private branch exchange switching system.

4. A method according to claim 2 including the step of connecting said second terminal direct to said local area network.

5. A method according to claim 1 including the step of connecting said first terminal to said first interface of said public data switched network through a switched telephone network.

6. A method according to claim 1 including the step of connecting said first terminal to said first interface of said public data switched network through a switched telephone network and a telephony to packet data server connected to said first interface to said public packet switched data network.

7. A method according to claim 6 wherein said public packet switched data network is the Internet, and said first and second terminals are telephone terminals, and said information initiated by said first terminal includes identification of the domain name of said access gateway.

8. A method according to claim 7 including the step of identifying said domain name in said information initiated by said first station through voice recognition.

9. A method according to claim 6 wherein said public packet switched data network comprises the Internet, and said first and second terminals are telephone terminals, and said information initiated by said first terminal includes identification of the domain name of said access gateway and a direct inward dial number for said second terminal.

10. A method of telephony communication via a public packet switched data network from a first telephone terminal connected to a public switched telecommunications network to a second telephone terminal connected to a local area network connected to a plurality of telephone terminals for interactive voice providing voice communication therebetween, said local area network being connected to an access gateway comprising the steps of:

a) dialing from said first terminal a predetermined designation for said access gateway to attempt to establish a telephony link with said second telephone terminal;

b) responsive to said dialing of said predetermined designation establishing a link from said public switched telecommunications network to a telephony to packet data server and from said data server to a first interface to said public packet switched data network;

c) establishing a link from said first interface to said public packet data switched network through said network to a second interface to said public packet data switched network and from said second interface to said access gateway;

d) pre-storing in data storage in said access gateway tables of access data and processing routines;

e) receiving at said access gateway data provided by said first telephone terminal including an address identifying said second telephone terminal;

f) comparing said data provided by said first telephone terminal with data in said access gateway tables using at least one of said processing routines; and g) upon identifying a match between at least certain of said data provided by said first telephone terminal with said pre-stored data, processing said attempt to establish a telephony link with said second telephone terminal by establishing a link from said access gateway through said local area network to one of said plurality of telephone terminals connected to said local area network, the identity of said one of said plurality of terminals depending upon the outcome of processing indicated by the correspondence of data provided by said first telephone station with data pre-stored in said storage and conditions established in said processing routines.

11. A method according to claim 10 wherein said public packet switched data network comprises the Internet.

12. A method according to claim 11 including obtaining said information from said first telephone terminal by interactive voice prompt and voice recognition dialog.

13. A method according to claim 12 wherein said information includes identification of an address for said access gateway.

14. A method according to claim 13 wherein said information also includes a direct inward dial number for said second telephone terminal.

15. A method according to claim 13 wherein said identification of an address for said access gateway comprises the domain name of said access gateway.

16. A hybrid telephony communication system comprising:

a switched telecommunications network including interconnected switching systems serving telephone terminals and having a separate packet switched control network which includes a controller and signal transfer points and service switching points associated with said switching systems;

a public packet switched data network having router interfaces;

a packet network server connected between one or more of said switching systems and one or more of said router interfaces;

a local area network providing communication between a plurality of telephone terminals associated therewith;

an access gateway connected between said local area network and one or more of said router interfaces; and security storage associated with said access gateway and having stored therein data relating to at least certain of said plurality of telephone terminals associated with said local area network;

said access gateway including a processor selectively running application routines associated with certain of said plurality of terminals and said data stored in said security storage, wherein;

a caller using one of said telephone terminals served by said switching systems establishes telephonic communication with one of said plurality of terminals associated with said local area network by a link through said telecommunications network and said packet network server and said public packet switched data network and said access gateway and said local area network after inputting information corresponding to data in said security storage and satisfying criteria imposed by said processor running an application routine associated with the telephone terminal with which said caller using one of said telephone terminals served by said switching systems establishes telephonic communication.

17. A communication system according to claim 16 including an intelligent peripheral platform associated with said control network and having voice prompt and voice recognition capability, said intelligent peripheral platform obtaining at least certain of said information inputted by said caller using one of said telephone terminals served by said switching systems.

18. A communication system according to claim 17 wherein said intelligent peripheral platform is connected to said controller via a data link.

19. A communication system according to claim 18 wherein said telephonic communication which is established is initiated by said caller dialing a number which causes suspension of the call, accessing said controller, signaling between said controller and said intelligent peripheral platform, and voice communication between said intelligent peripheral platform and said caller.

20. A communication system according to claim 19 wherein said public packet switched data network comprises the Internet.

21. A communication system according to claim 16 including a private branch exchange switching system connecting said plurality of terminals to said local area network.

22. A communication system according to claim 21 including a separate connection of said private branch exchange switching system to one of said switching systems in said switched telecommunications network.

23. A communication system according to claim 22 including computers connected to said local area network, and a local area network to packet switched data network server connected between said local area network and one or more of said router interfaces to said packet switched data network.

24. A communication system according to claim 23 wherein said local area network to packet switched data network server blocks telephony communication signals.

\* \* \* \* \*